(12) United States Patent
Uchizono et al.

(10) Patent No.: US 7,382,418 B2
(45) Date of Patent: Jun. 3, 2008

(54) LIQUID CRYSTAL TELEVISION RECEIVER

(75) Inventors: Tatsuya Uchizono, Takefu (JP); Kenji Shimoshita, Takefu (JP)

(73) Assignee: Orion Electric Co., Ltd., Echizen (JP)

( * ) Notice: Subject to any disclaimer, the term of this patent is extended or adjusted under 35 U.S.C. 154(b) by 575 days.

(21) Appl. No.: 10/945,586

(22) Filed: Sep. 21, 2004

(65) Prior Publication Data

US 2005/0078229 A1    Apr. 14, 2005

(30) Foreign Application Priority Data

Sep. 30, 2003  (JP) ............................. 2003-339644
Feb. 27, 2004  (JP) ............................. 2004-054289

(51) Int. Cl.
*H04N 5/64* (2006.01)
*A47F 5/00* (2006.01)

(52) U.S. Cl. .................................. 348/794; 248/125.1
(58) Field of Classification Search ................ 348/787, 348/789, 794, 790, 836, 838
See application file for complete search history.

(56) References Cited

U.S. PATENT DOCUMENTS

| | | | | |
|---|---|---|---|---|
| 6,010,111 A | * | 1/2000 | Cho ........................ | 248/346.06 |
| 6,189,842 B1 | * | 2/2001 | Bergeron Gull et al. . | 248/125.1 |
| 6,378,830 B1 | * | 4/2002 | Lu .......................... | 248/278.1 |
| 6,570,627 B1 | * | 5/2003 | Chang ..................... | 348/794 |
| 6,766,994 B2 | * | 7/2004 | Serbinski et al. ......... | 248/371 |
| 7,014,154 B2 | * | 3/2006 | Jeong et al. .............. | 248/157 |
| 7,023,499 B2 | * | 4/2006 | Williams et al. .......... | 348/836 |
| 2004/0041851 A1 | * | 3/2004 | Lu ........................... | 345/905 |

FOREIGN PATENT DOCUMENTS

JP   3069339      3/2000
JP   2000-213526  8/2000

* cited by examiner

*Primary Examiner*—Paulos M. Natnael
(74) *Attorney, Agent, or Firm*—Renner, Otto, Boisselle & Sklar, LLP

(57) ABSTRACT

The invention provides a liquid crystal television receiver, a liquid crystal display of a desktop computer and the like, which is equipped with a pivoting means capable of statically maintaining the image display portion stably with the hinge portion prevented from being loosened even after performing tilting operation repeatedly for a long period of time. The invention provides a liquid crystal television receiver comprising a television receiver body equipped with a liquid crystal panel and a control unit, which is pivotally supported on a leg portion so as to enable tilting of the television receiver body, wherein a hinge portion pivotally supporting the television receiver body in a tiltable manner is composed of a pair of left and right hinge portions, the left and right hinge portions are respectively composed of a stand portion attached to the leg portion and a swing portion attached to the television receiver body, and the left and right hinges are assembled to form an integral hinge portion.

5 Claims, 15 Drawing Sheets

FIG. 7(d)
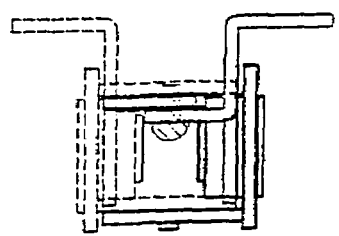
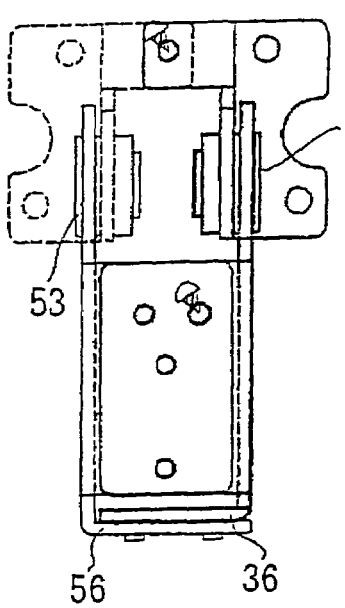
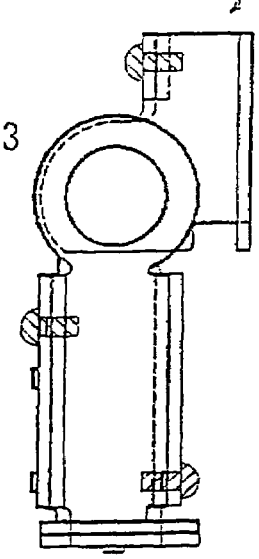
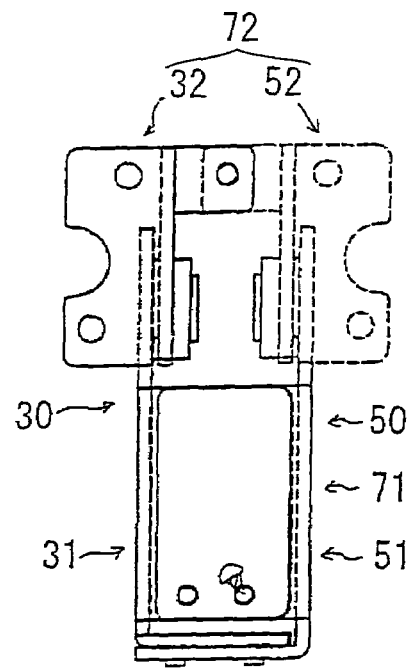
FIG. 7(a)  FIG. 7(b)  FIG. 7(c)

LIQUID CRYSTAL TELEVISION RECEIVER

The present application is based on and claims priority of Japanese patent applications No. 2003-339644 filed on Sep. 30, 2003 and No. 2004-54289 filed on Feb. 27, 2004, the entire contents of which are hereby incorporated by reference.

BACKGROUND OF THE INVENTION

1. Field of the Invention

The present invention relates to a liquid crystal television receiver in which a television receiver body equipped with a liquid, crystal panel and a control unit is pivotally supported on a leg portion in a tiltable fashion.

The present invention is described using a liquid crystal television receiver as an example of the preferred embodiment of the invention, but it is applicable to liquid crystal displays of desk top personal computers and the like. It is also obviously applicable to any type of hinge structure bearing a pivoting movement.

2. Description of the Related Art

Liquid crystal television receivers or liquid crystal displays of desk top personal computers etc. are pivotally supported to enable tilting movement thereof so that a viewer (user) can select the most suitable viewing angle. The pivoting means for such equipment generally adopts a structure in which a stand portion and a swing portion are pivotally supported via a pin.

Such pivoting means suffered the drawback of the hinge portion being loosened after long term use of the equipment during which the tilting operation is repeated, and in some cases it became impossible to stably support the image display portion in a static manner.

Patent document 1 discloses a tilt hinge in which the hinge portion is riveted to strengthen the fixture of the tilt movement portion, but according to this disclosure, the riveting operation is performed from the side face of the hinge portion, and since the rivet pin and washer remain on the side face, the width of the hinge portion is inevitably increased.

As an alternative, it is possible to constitute the hinge portion with a pair of spaced-apart members and to perform the riveting operation from the inner sides thereof. However, this will not reduce the width of the hinge portion, and since the rigidity in the twisting direction of the pair of independent hinge members is weak, stable tilting movement cannot be performed if a twisting force is added when tilting the equipment.

Patent document 2 also discloses an art related to a similar hinge structure.

Patent Document 1:
Japanese Patent Laid-Open No. 2000-213526
Patent Document 2:
Japanese Registered Utility Model No. 3069339

SUMMARY OF THE INVENTION

In order to solve the problems of the prior art, the present invention aims at providing a liquid crystal television receiver having a pivoting means capable of statically supporting the image display portion in a stable manner since the hinge portion will not be loosened after long term use of the equipment and repeated tilting operation. Further, the present invention aims at providing an equipment equipped with a hinge portion having a small width and a strong structure.

According to a first aspect of the present invention, the liquid crystal television receiver comprising a television receiver body equipped with a liquid crystal panel and a control unit, which is pivotally supported on a leg portion so as to enable tilting of the television-receiver body in front and rear directions comprises a hinge portion for pivotally supporting the television receiver body in a tiltable manner which is formed of a pair of left and right hinge portions, the left and right hinge portions each respectively composed of a stand portion attached to the leg portion and a swing portion attached to the television receiver body, and the left and right hinge portions are assembled to form an integral hinge portion.

According to a second aspect of the present invention, the liquid crystal television receiver according to the first aspect of the invention characterizes in that the left and right hinge portions are formed to have plane symmetric shapes, and the left and right hinge portions are assembled and screwed together to form the hinge portion.

According to a third aspect of the present invention, the liquid crystal television receiver according to the second aspect of the invention characterizes in that the stand portions of the left and right hinge portions are respectively shaped to have an angulated U-shape cross-section, and the stand portions are assembled by having the openings of the U-shapes oppose one another to form a square column shape.

According to a fourth aspect of the present invention, the liquid crystal television receiver according to any one of the above aspects characterizes in that the hinge portion having an assembled rectangular column shape is formed so that side surface portions of the left and right hinge portions disposed in front and rear directions of the liquid crystal television receiver constitute a double layered structure.

According to a fifth aspect of the present invention, the liquid crystal television receiver according to any one of the above aspects characterizes in that the stand portion and swing portion of the left and right hinge portions are pivotally supported via a pin, and the pin is riveted to pivotally fasten the stand portion and the swing portion together in a tiltable manner.

According to a sixth aspect of the present invention, the liquid crystal television receiver according to any one of the above aspects characterizes in that a biasing means for biasing the swing portion is attached to the stand portion, and the biasing means biases the swing portion rearward when the television receiver body is tilted to the frontward direction.

According to a seventh aspect of the present invention, the liquid crystal television receiver according to the sixth aspect of the invention characterizes in that the biasing means is composed of a fixing plate fixed to the stand portion and an engagement portion integrally formed with the mounting plate and engaged to the swing portion.

The present invention forms a hinge portion from a pair of left and right hinge portions which are assembled together to form an integral hinge portion, according to which the formed hinge portion has a simple structure and improved strength. Therefore, the present invention provides a liquid crystal television receiver in which the direction of the liquid crystal panel can be adjusted appropriately to any viewing angle with freedom.

Since the shapes of the left and right hinge portions are plane symmetric, it is possible to form the front and rear directions of the equipment with two layered members by assembling the left and right hinges together, according to which a hinge portion of a liquid crystal television receiver having high strength can be provided.

Since the hinge portion is composed by assembling a pair of left and right hinge portions, the left and right hinge portions can be easily riveted (fastened for example by pressing and widening an end of a pin) from the inner side of the pivoting portion and the flat-head portion of the pin can be disposed on the outer side of the pivoting portion, so the width of the hinge portion can be formed small. Furthermore, by pivotally fastening the pivoting portion via riveting, the television receiver body can be tilted more freely within larger tilt angles and statically held at any desired angle.

Moreover, since a biasing means for biasing the swing portion is attached to the stand portion so as to bias the swing portion rearward by the biasing means when the television receiver body is tilted frontward, the rotational forces required for tilting the television receiver body frontward and rearward can be substantially equalized, and the television receiver body can be tilted in a stable fashion. Thus, the present invention enables to provide a liquid crystal television receiver having an advantageous quality and capable of preventing the receiver from turning over when the tilting operation of the television receiver body is performed by a rapid motion.

Furthermore, since the biasing means is composed of a mounting plate fixed to the stand portion and an engagement portion formed integrally with the mounting plate and engaged with the swing portion, the present invention enables to provide a liquid crystal television receiver that is cost-effective without having to use expensive coil springs and the like.

BRIEF DESCRIPTION OF THE DRAWINGS

FIG. 7 is a four-side view of the hinge portion in which the left and right hinge portions are assembled;

DETAILED DESCRIPTION OF THE PREFERRED EMBODIMENT

Figure 1:
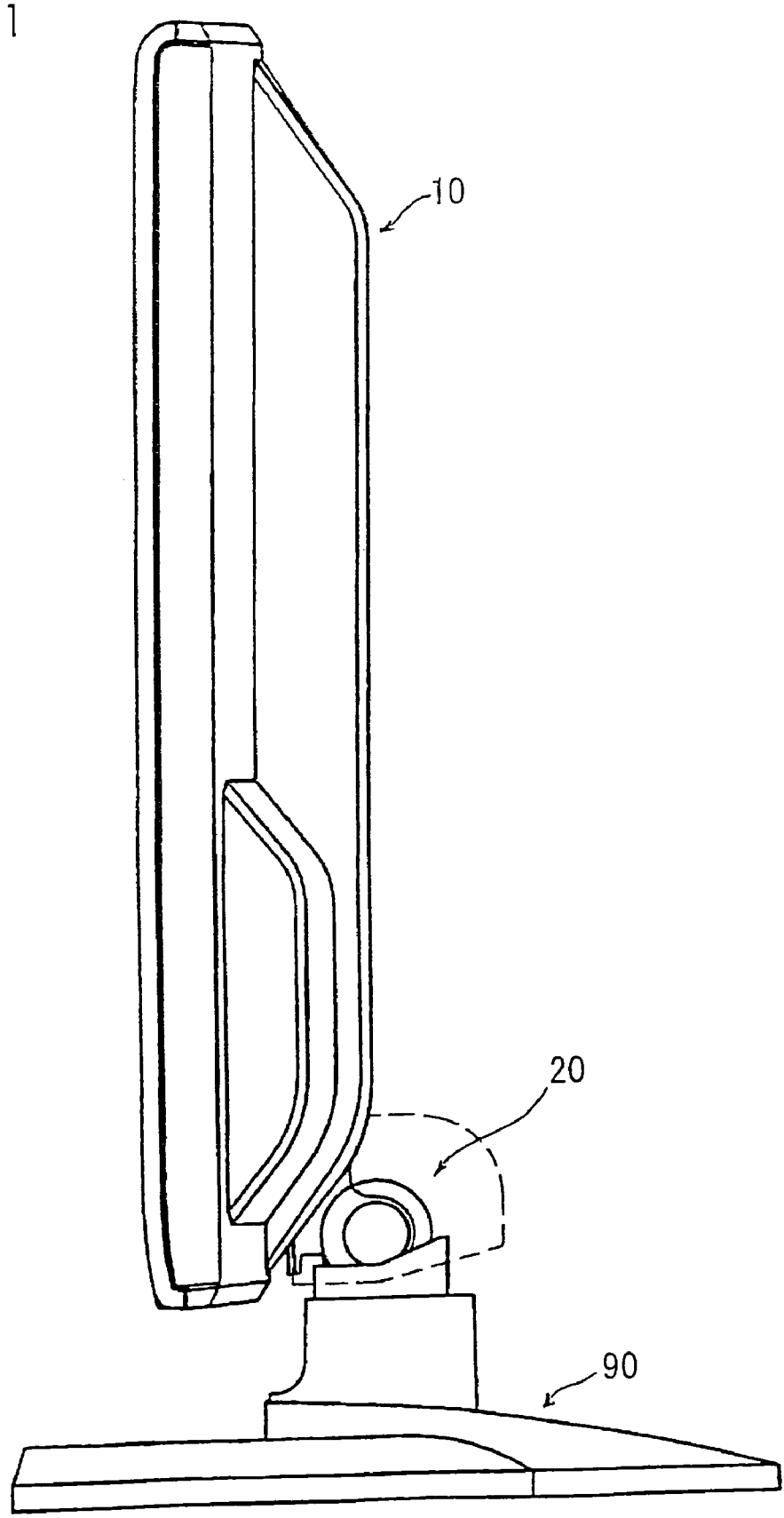
FIG. 1 is a side view of a liquid crystal television receiver according to the present invention in which a hinge cover (illustrated in dotted lines) is removed to show the hinge portion clearly.

Now, the present invention will be described according to the preferred embodiments. FIG. 1 is a side view showing the present invention applied to a liquid crystal television receiver, shown with a hinge cover removed (illustrated by dotted lines) so as to clearly illustrate the hinge portion.

Figure 2:
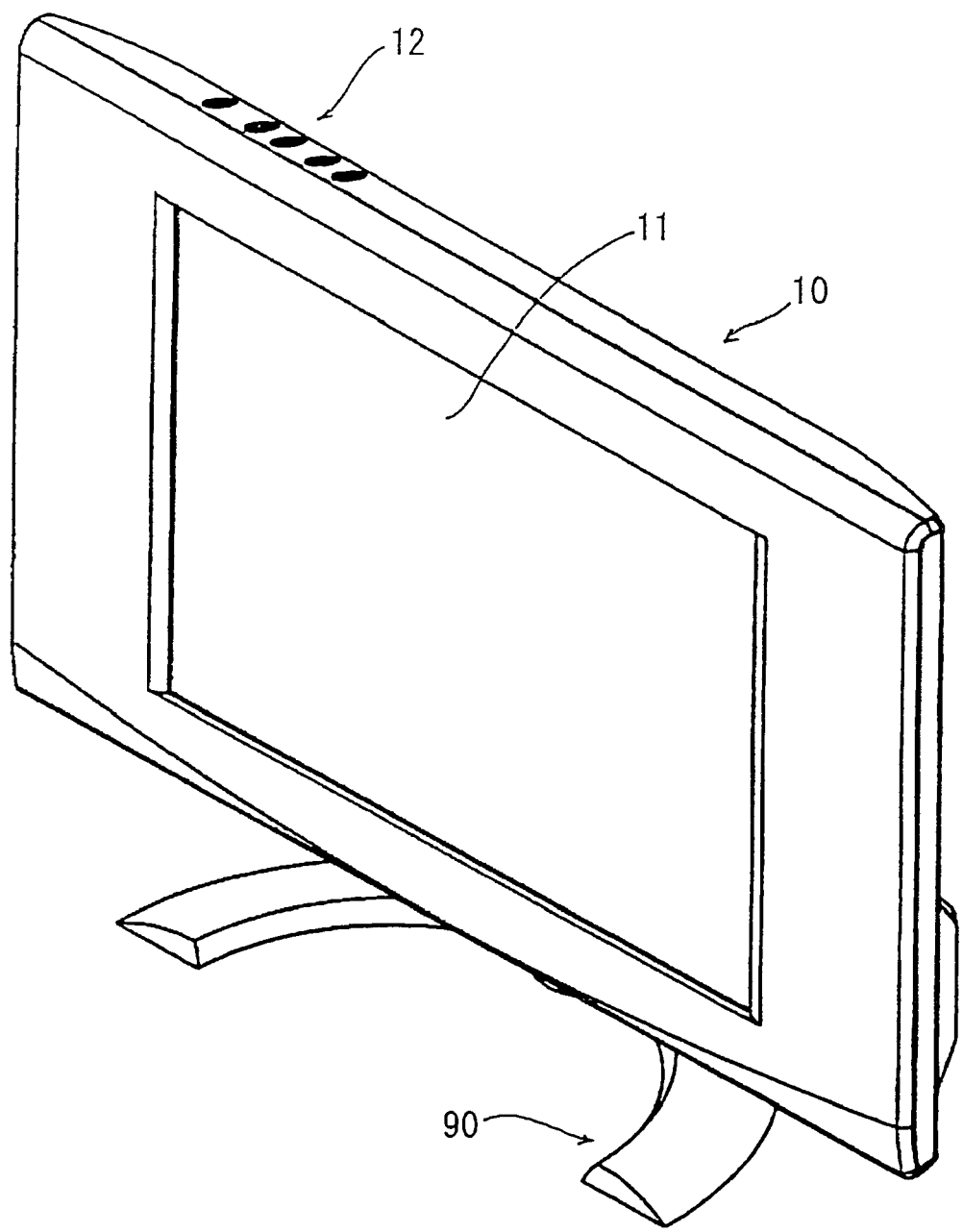
FIG. 2 is a perspective front view of the liquid crystal television receiver according to the present invention.
Figure 3:
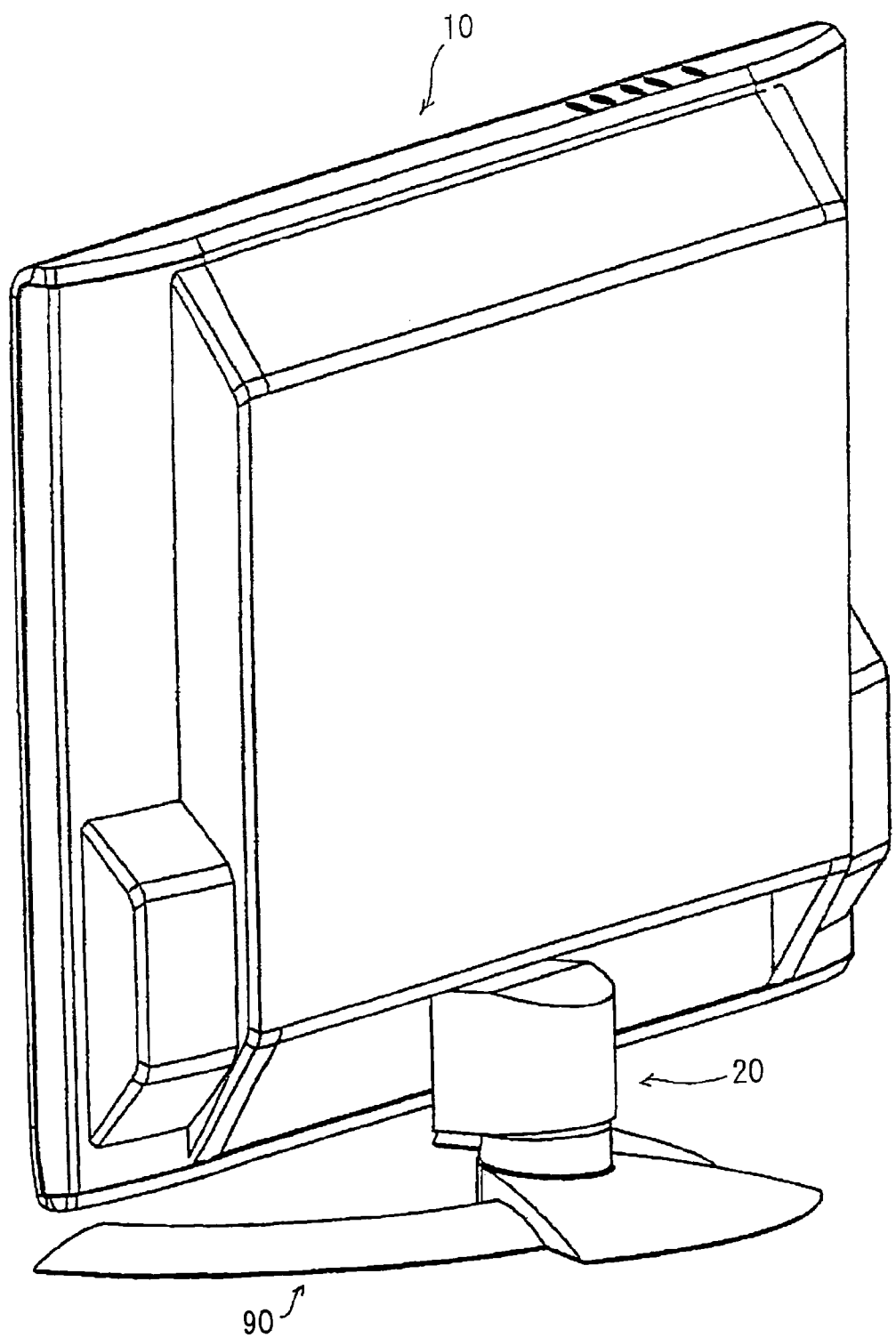
FIG. 3 is a perspective back view of the liquid crystal television receiver according to the present invention.

As shown in FIGS. 1 through 3, the liquid crystal television receiver comprises a television receiver body 10 equipped with a liquid crystal panel display 11 and a control unit 12, which is pivotally supported by a leg portion 90 via a hinge portion 20.

In FIG. 1, the television receiver body 10 is capable of being tilted in the left and right directions with respect to the leg portion 90 pivoting around a pivot axis of the hinge portion 20. According to the television receiver body 10, the visual angle of the liquid crystal panel display 11 can be changed freely to face the operator (viewer) by simply holding an appropriate portion of the body 10 and tilting the body 10 to the desired direction.

Figure 4:
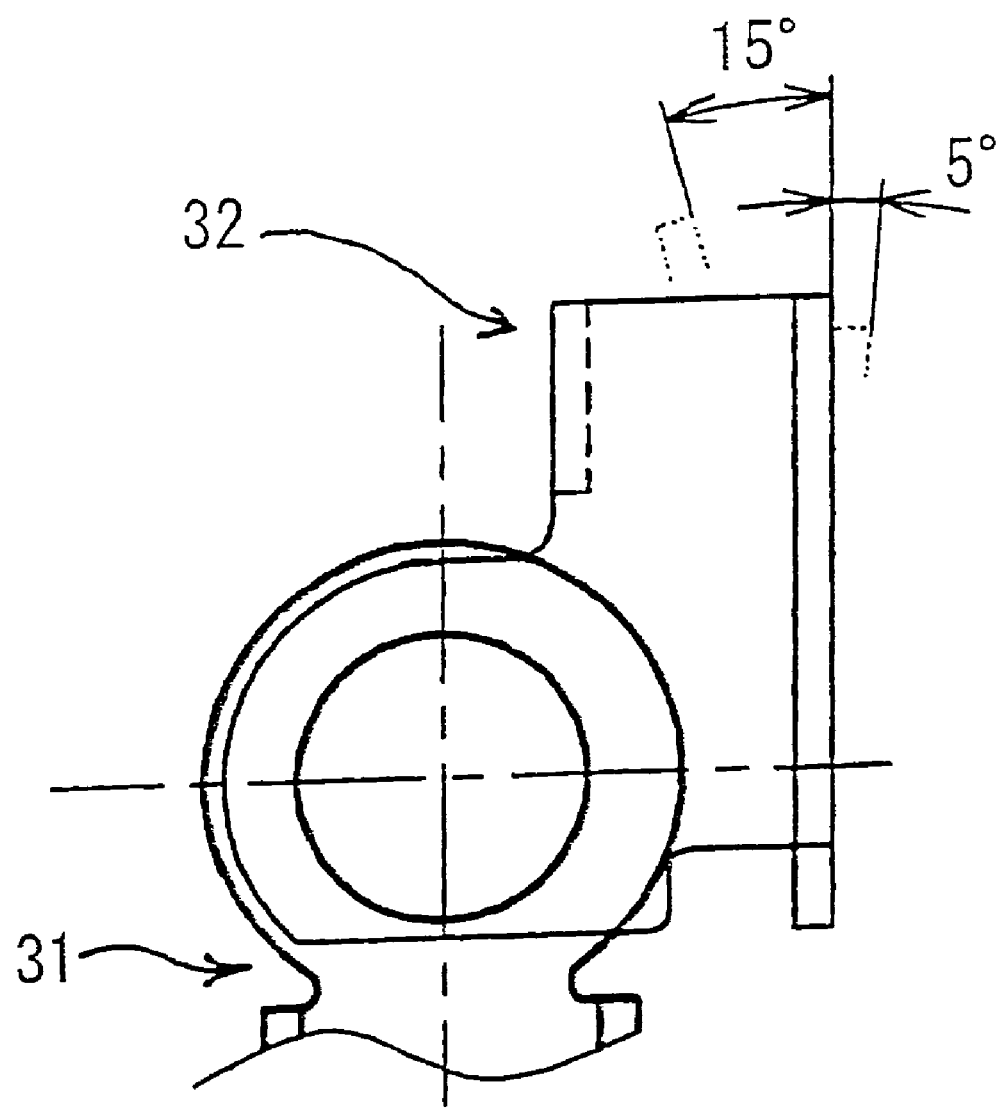
FIG. 4 is a partial detailed view of a hinge portion.

FIG. 4 is a partial detailed view for explaining the tilting operation around the hinge portion 20, illustrating the hinge portion from the opposite direction of FIG. 1, showing the state in which the hinge is capable of being tilted for 5 degrees toward the front and 15 degrees toward the back. This range of movement is merely a matter of design and can be selected appropriately according to the status of use of the equipment to which the present invention is actually applied. In some applications, it is possible to set the range of movement to exceed 180 degrees.

Figure 5:
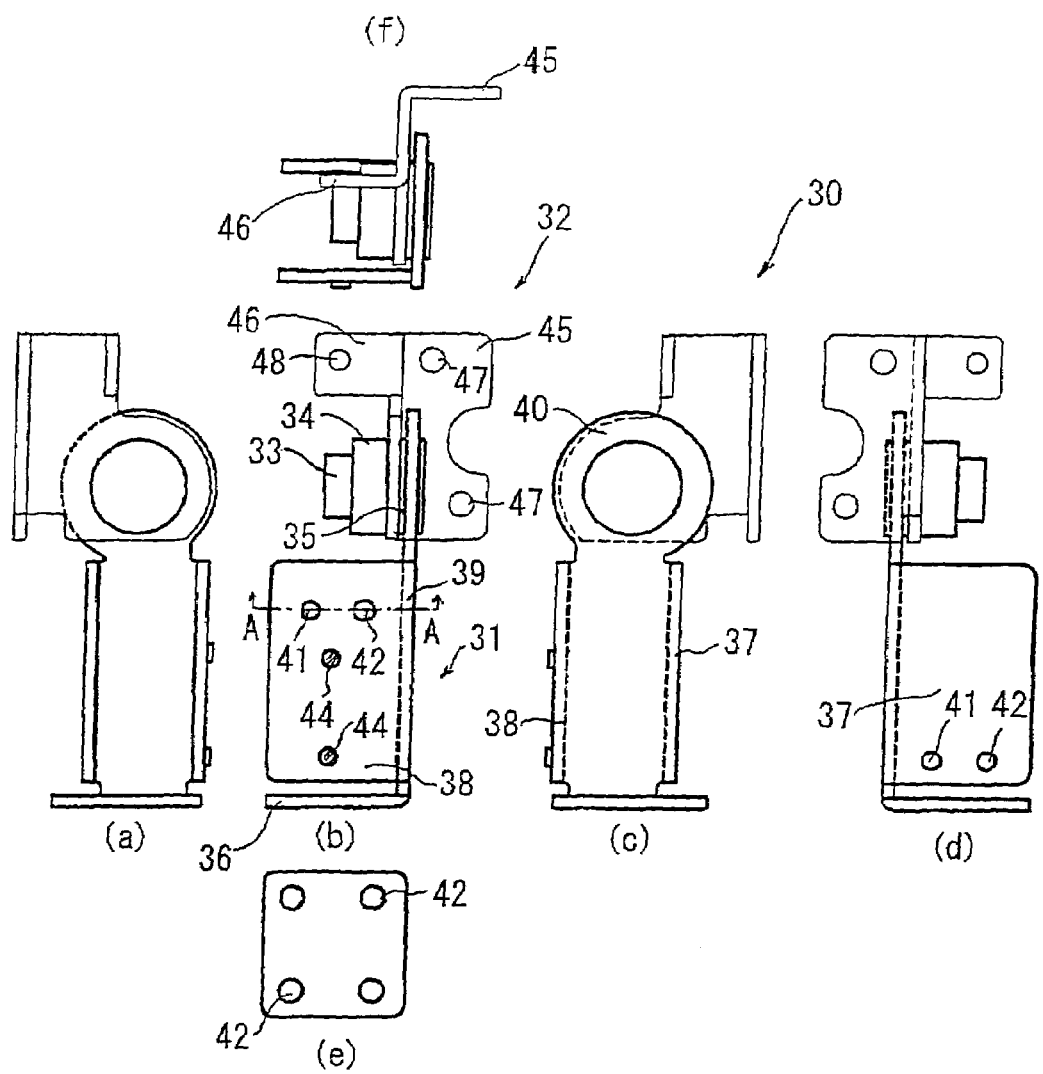
FIG. 5 is a six-side view of a left hinge portion.
Figure 6:
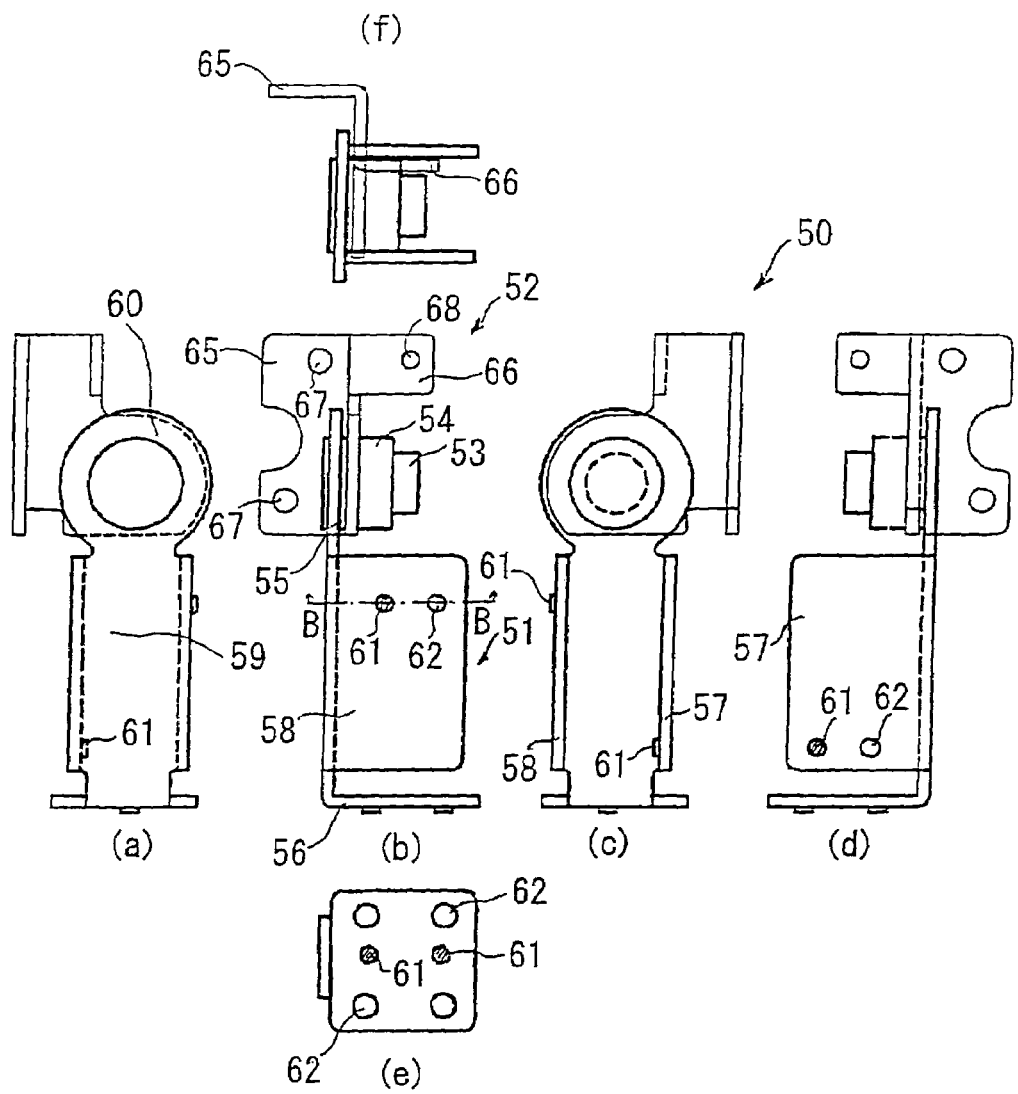
FIG. 6 is a six-side view of a right hinge portion.

The hinge portion 20 is constructed of a pair of left and right hinge portions 30 and 50, the details of which are illustrated in FIGS. 5 and 6. FIG. 5 is a six-side view of the left hinge portion 30, in which (a) is a right side view, (b) is a back view, (c) is a left side view, (d) is a front view, (e) is a bottom view and (f) is an upper view. FIG. 6 is a six-side view of the right hinge portion 50, in which (a) is a right side view, (b) is a back view, (c) is a left side view, (d) is a front view, (e) is a bottom view and (f) is an upper view.

The left and right hinge portions 30 and 50 are respectively formed of main members, which are stand portions 31 and 51 and swing portions 32 and 52. In the present application, the stand portion in the drawing is illustrated by heavy lines and the swing portion is illustrated by thin lines, in order to clearly distinguish the stand portion and swing portion. The swing portions 32 and 52 are respectively pivotally supported via pins 33 and 53 on the stand portions 31 and 51. FIGS. 5 and 6 illustrate states in which the swing portions 32 and 52 are pivotally supported via pins 33 and 53 on the stand portions 31 and 51, and washers 34, 35 and 54, 55 are inserted thereto, but pins 33 and 53 are not yet riveted.

The stand portion 31 of the left hinge portion 30 is equipped with an upright surface 39 that is raised in upright form from a leg portion attachment surface 36 to form an L-shape, and the surface 39 is connected to a substantially circular pivot surface 40. In front of and behind the upright surface 39 are formed front and rear engagement surfaces 37 and 38 formed by bending, which constitute an angulated U-shaped cross-section together with the upright surface 39. An embossment engagement hole 41 and a screw engagement hole 42 are formed on the front engagement surface 37, and embossments 44, 44, an embossment engagement hole 41 and a screw engagement hole 42 are formed on the rear engagement surface 38. In the drawings, in order to visually clearly distinguish the holes and embossments, the embossments are illustrated with three slant lines.

On the other hand, the stand portion 51 of the right hinge portion 50 is equipped with an upright surface 59 that is raised in upright form from a leg portion attachment surface 56 to form an L-shape, and the surface 59 is connected to a substantially circular pivot surface 60. In front of and behind the upright surface 59 are formed front and rear engagement surfaces 57 and 58 by bending, which constitute an angulated U-shaped cross-section together with the upright surface 59. On the front engagement surface 57, an embossment 61 is formed at a position capable of engaging with the embossment engagement hole 41 on the front engagement surface 37 of the left hinge portion 30, and a screw engagement hole 62 is formed at a position corresponding to the screw engagement hole 42 on the front engagement surface 37 of the left hinge portion 30. On the rear engagement surface 58, an embossment 61 is formed at a position capable of engaging with the embossment engagement hole 41 on the rear engagement surface 38 of the left hinge portion 30, and a screw engagement hole 62 is formed at a position corresponding to the screw engagement hole 42 on the rear engagement surface 38 of the left hinge portion 30. In FIG. 6, similar to FIG. 5, in order to visually clearly distinguish the holes and embossments, the embossments are illustrated with three slant lines.

According to such structure, upon assembling the left hinge portion 30 and the right hinge portion 50, positioning is assured by the embossments engaging with the embossment engagement holes.

A swing portion 32 is pivotally supported via a pin 33 by the stand unit 31 of the left hinge portion 30 in a freely tiltable manner. The swing portion 32 is equipped with a body attachment surface 45 for attaching the television receiver body 10 and an engagement surface 46. Body attachment screw holes 47 and 47 are formed on the body attachment surface 45 of the swing portion 32 of the left hinge portion 30, and a screw engagement hole 48 is formed on the engagement surface 46.

Screw engagement holes 42, 42, 42 and 42 are formed on the leg attachment surface 36 of the stand portion 31 of the left hinge portion 30.

A swing portion 52 is pivotally supported via a pin 53 by the stand unit 51 of the right hinge portion 50 in a freely tiltable manner. The swing portion 52 is equipped with a body attachment surface 65 for attaching the television receiver body 10 and an engagement surface 66. Body attachment screw holes 67 and 67 are formed on the body attachment surface 65 of the swing portion 52 of the right hinge portion 50, and a screw engagement hole 68 is formed on the engagement surface 66.

Screw engagement holes 62, 62, 62 and 62, and an embossment 61 (not shown) to be used for positioning with the leg portion 90, are formed on the leg attachment surface 56 of the stand portion 51 of the right hinge portion 50.

Thus, upon assembling the left hinge portion 30 and the right hinge portion 50, the engagement surface 46 of the left hinge portion 30 and the engagement surface 66 of the right hinge portion 50 are superposed and positioned appropriately, the screw engagement hole 48 and the screw engagement hole 68 are matched and screwed together, by which the swing portion 32 of the left hinge portion 30 and the swing portion 52 of the right hinge portion 50 are fastened securely in an integral manner.

Figure 8:
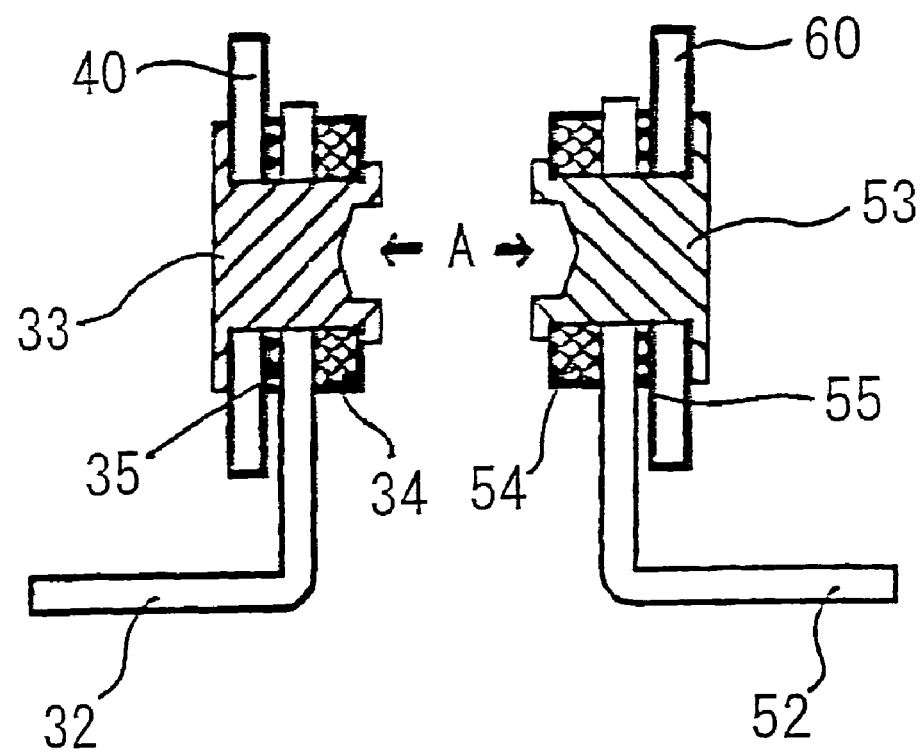
FIG. 8 is a cross-sectional view showing the riveted state of the left and right hinge portions.

The pivot surface 40 of the stand portion 31 of the left hinge portion 30 and the swing portion 32 are pivotally supported via a pin 33, wherein washers 34 and 35 are inserted before the pin 33 is riveted from direction A of FIG. 8, so as to pivotally fasten the stand portion 31 and the swing portion 32 to allow tilting thereof.

The pivot surface 60 of the stand portion 51 of the right hinge portion 50 and the swing portion 52 are pivotally supported via a pin 53, wherein washers 54 and 55 are inserted before the pin 53 is riveted from direction A of FIG. 8, so as to pivotally fasten the stand portion 51 and the swing portion 52 to allow tilting thereof.

Thus, since the pivoting portions of the left and right hinge portions 30 and 50 are riveted, the bearing will not be loosened even through repeated tilting movement, and maintain a constantly stable fixed condition. Further, since the hinge portion 20 is constructed by assembling the left and right hinge portions 30 and 50 which are plane symmetric, the hinges can be riveted from direction A (inner direction), according to which the washer and riveted portions can be disposed inside the hinge portion 20 and the width of the whole hinge portion 20 can be reduced.

Further, since left and right hinge portions 30 and 50 are assembled together to form one integral hinge portion 20, the obtained hinge portion has high strength even with a small width and is strong against twisting.

The riveted left hinge portion 30 and the similarly riveted right hinge portion 50 have, as shown in FIG. 7, the stand portions 31 and 51 of two members assembled together to form a stand portion 71 having a substantially rectangular cross-section, and the swing portions 32 and 52 of the two members assembled to form an integral swing portion 72.

FIG. 7 shows a four-side view of the integral hinge portion 20 formed by riveting pins 33 and 53 and assembling the left and right hinge portions 30 and 50, wherein (a) is a back view, (b) is a right side view, (c) is a front view and (d) is an upper view. In FIG. 7, the left hinge portion 30 is illustrated using heavy lines, the right hinge portion 50 is illustrated using thinner solid lines (stand portion) and dotted lines (swing portion), and further in (a) and (c), screws are illustrated in perspective to show how the left and right hinge portions 30 and 50 are screwed together.

As shown in FIG. 7, the integral swing portion 72 formed by assembling two members constitutes a hinge portion 20 with high strength, since double layered members are disposed on the front and rear sides of the equipment. Moreover, the bottom surface portions 36 and 56 are designed to have sizes that differ by the thickness of the bottom plate, so that two surface portions can be superposed by placing one above the other.

Figure 9:
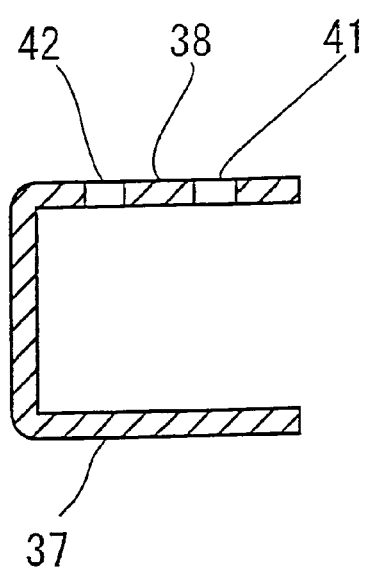
FIG. 9 shows A-A and B-B cross-sections of the left and right hinge portions.
Figure 9:
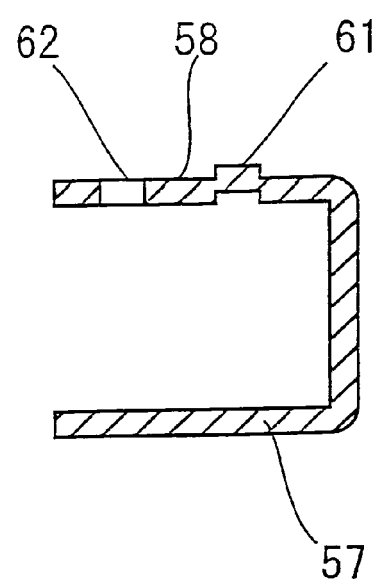

FIGS. 9(*a*) and 9(*b*) respectively show the A-A cross-section of the left hinge portion 30 and the B-B cross-section of the right hinge portion 50. An embossment 61 formed on a rear engagement surface 58 of the stand portion 51 of the right hinge portion 50 is fit to the embossment engagement hole 41 formed on the rear engagement surface 38 of the stand portion 31 of the left hinge portion 30, by which screw engagement holes 42 and 62 are matched and connected via a screw.

Figure 10:
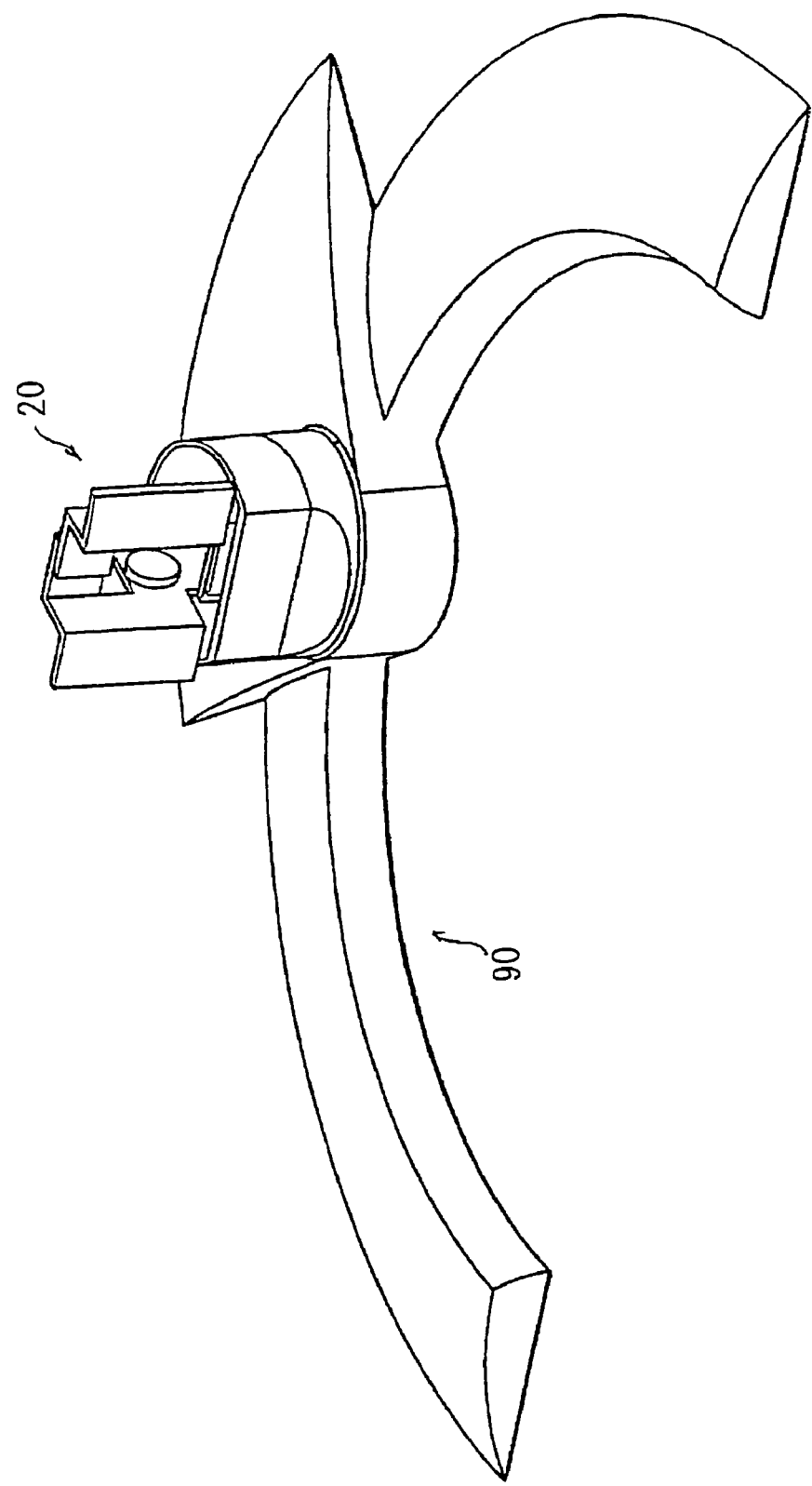
FIG. 10 is a perspective view showing the state in which the hinge portion is attached to a leg portion.

Thus, the integrally formed hinge portion 20 (screw engagement holes etc. are not shown) can be attached to a leg portion 90 with appropriate means (not shown) as illustrated in FIG. 10.

Figure 11:
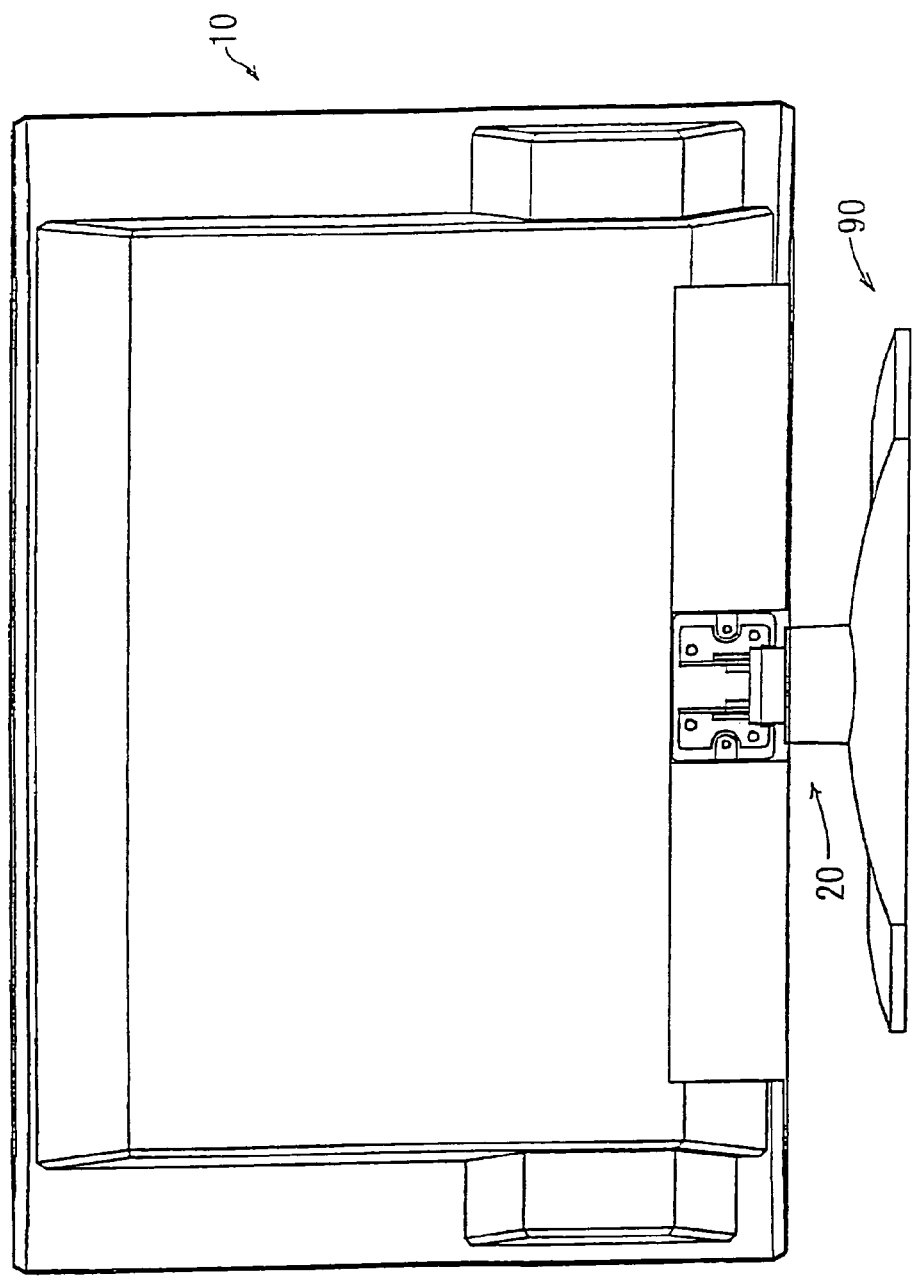
FIG. 11 is a detailed view showing the state in which the hinge portion is attached to the device body.

FIG. 11 illustrates a state in which the hinge portion 20 is attached via a screw on the television receiver body 10.

Embodiment 2

Figure 12:
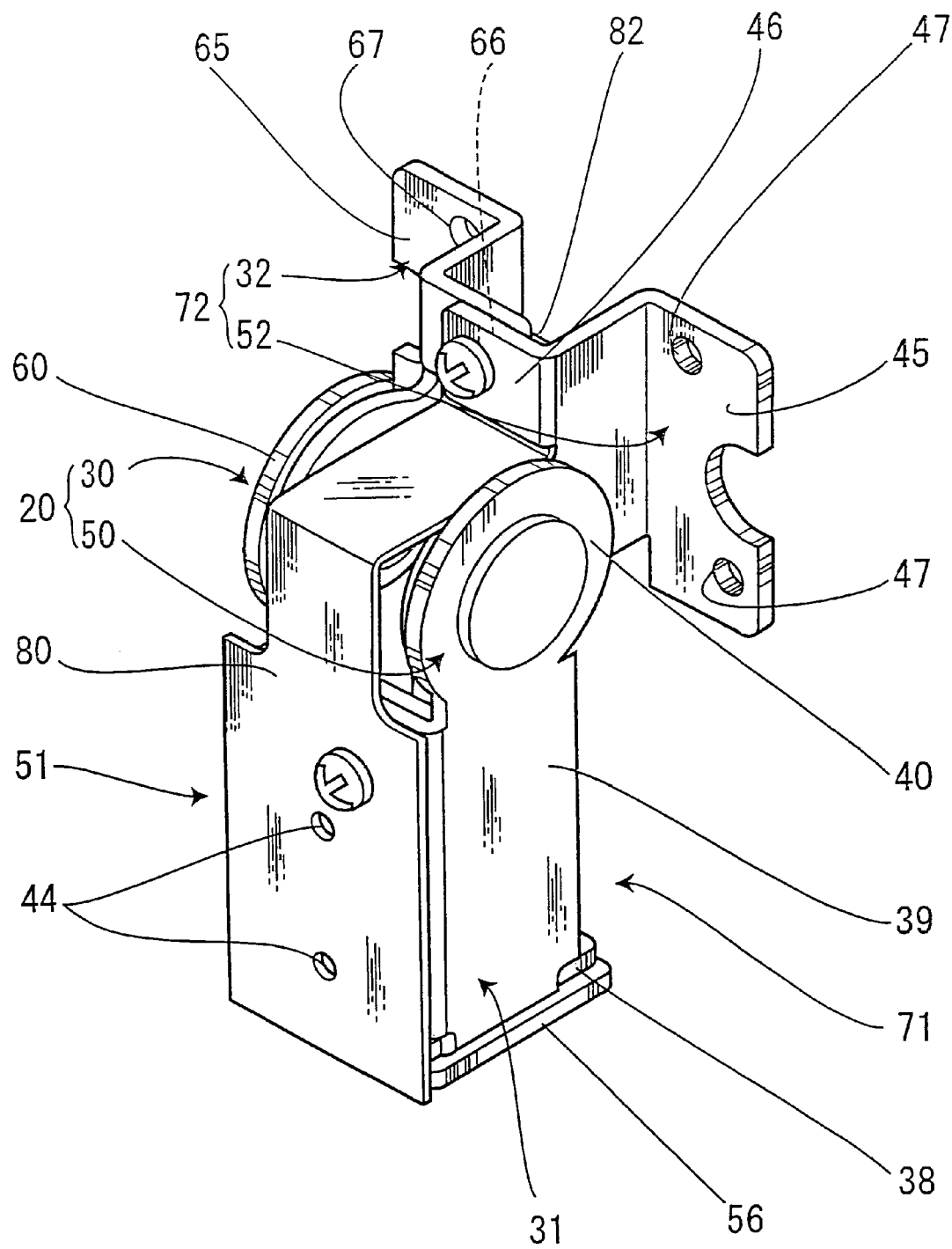
FIG. 12 is a perspective view showing the hinge portion of Embodiment 2.
Figure 13:
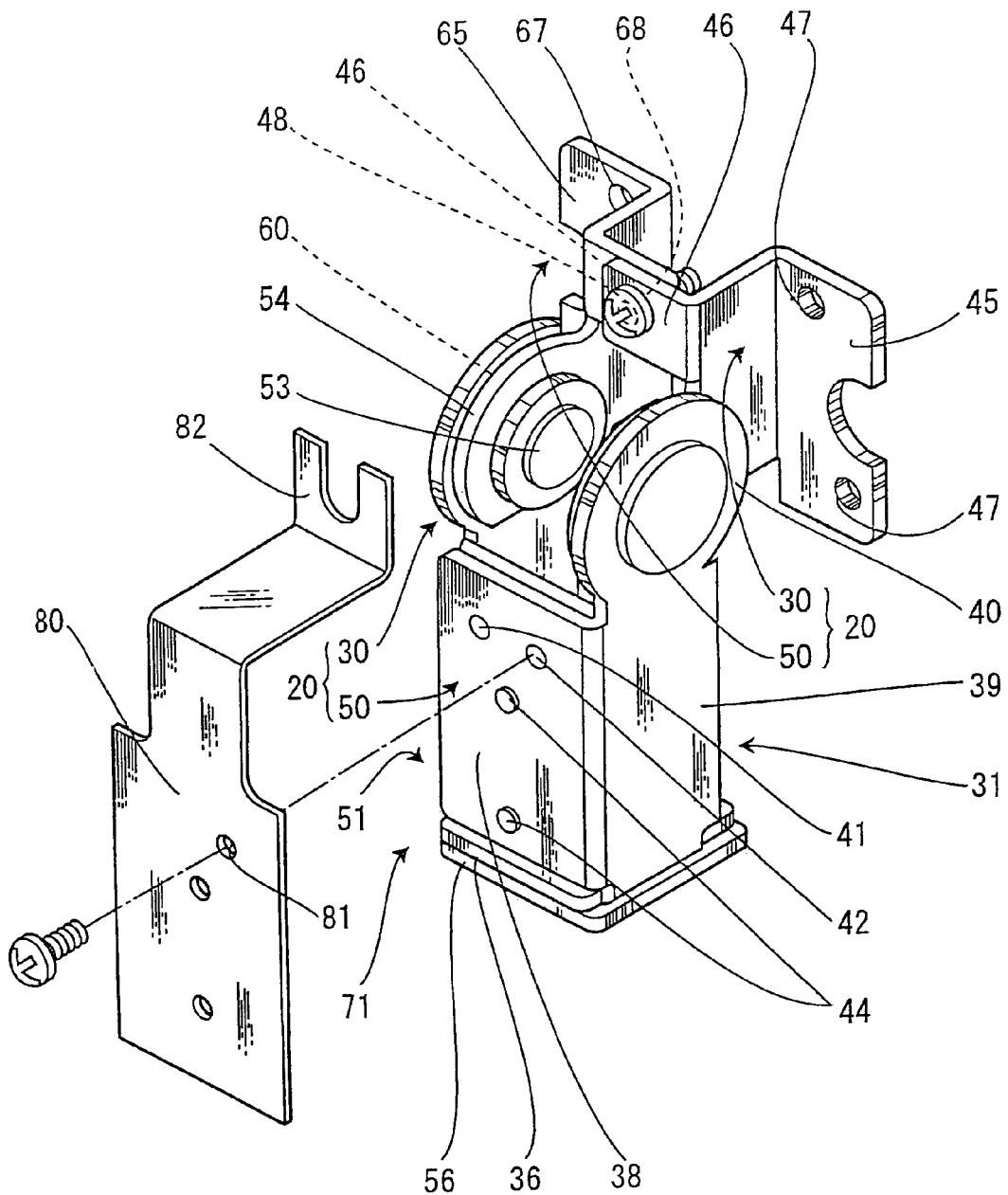
FIG. 13 is an exploded perspective view showing the state in which a biasing means is removed according to Embodiment 2.
Figure 14:
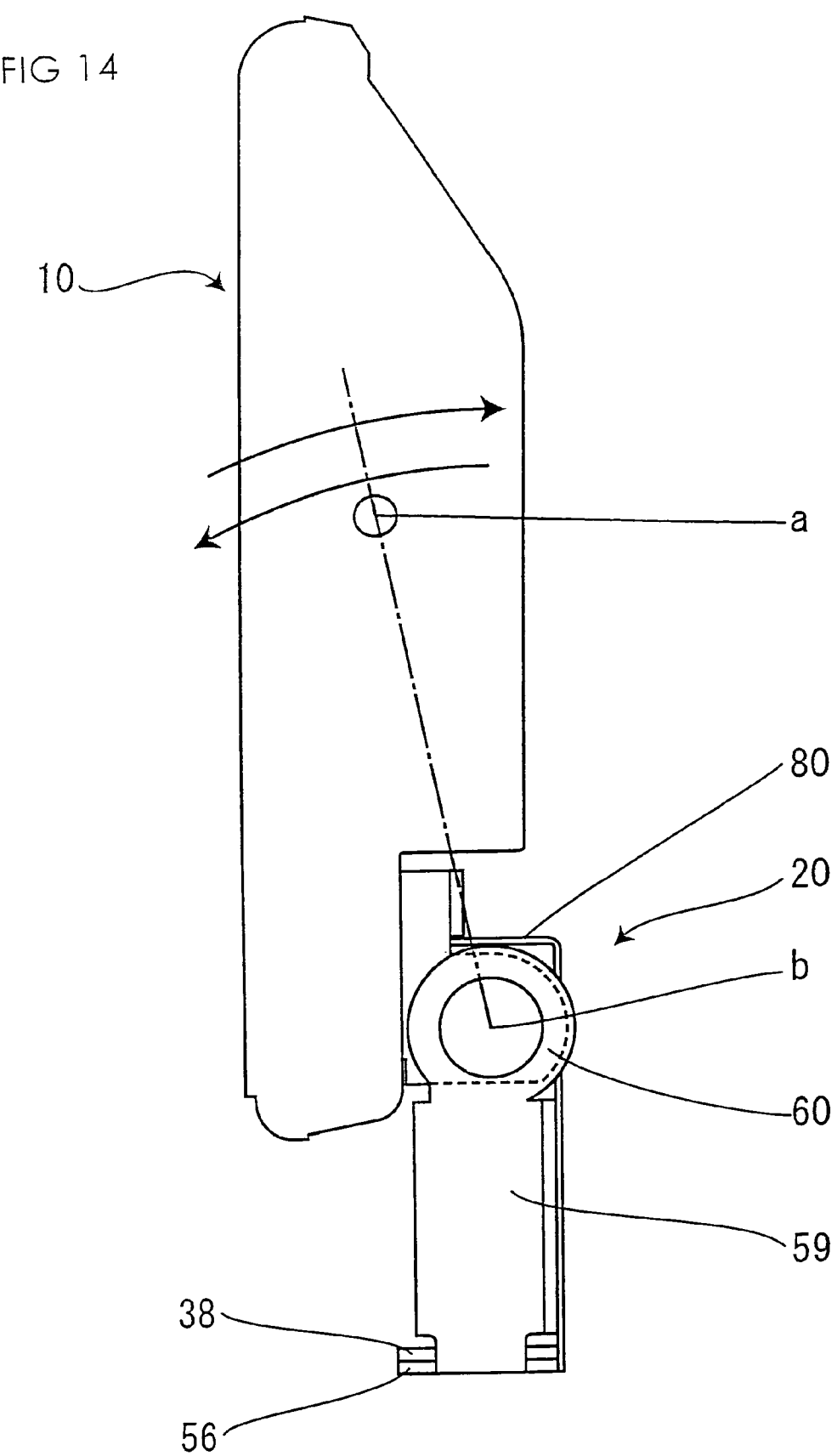
FIG. 14 is an explanatory view showing the liquid crystal television receiver of Embodiment 2.
Figure 15:
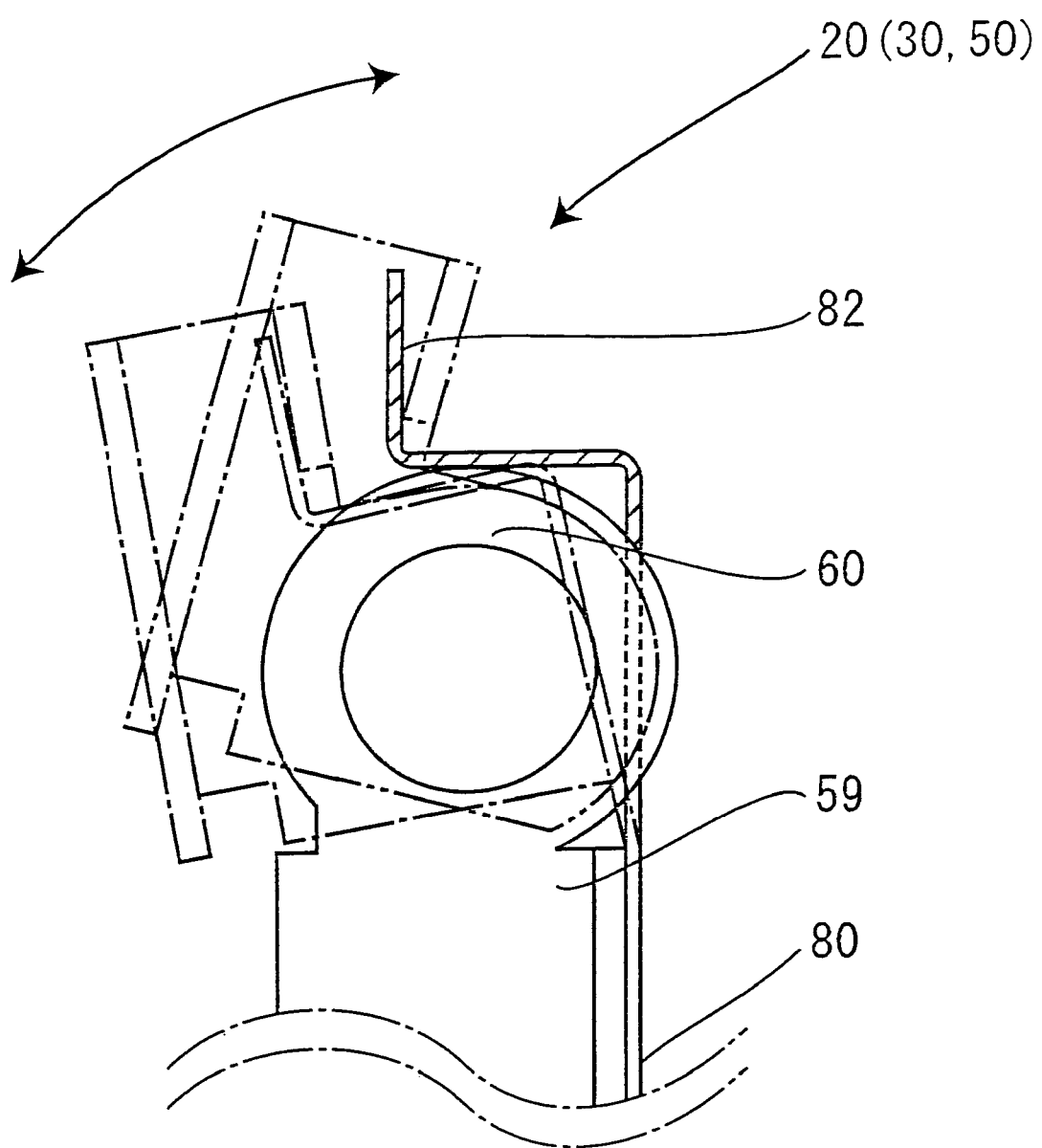
FIG. 15 is an enlarged cross-sectional view showing the main portion of the hinge portion.

Next, Embodiment 2 of the present invention will be described. FIG. 12 is an exploded perspective view showing a hinge portion according to Embodiment 2 of the present invention. FIG. 13 is an exploded perspective view showing the state in which a biasing means removed. FIG. 14 is an explanatory view showing a liquid crystal television receiver. FIG. 15 is an enlarged cross-sectional view showing the main part of the hinge portion.

The present embodiment is equivalent to Embodiment 1 except for the biasing means, so the same members as Embodiment 1 are denoted with the same reference numbers and the detailed descriptions thereof are omitted. The television receiver body 10 according to Embodiment 2 is large sized and heavy, equipped with a large liquid crystal panel display portion 11 having a screen size of 20 inches or larger.

The biasing means is composed of a mounting plate 80 for fixture to a stand portion 71, and an engagement portion 82 formed integrally with the mounting plate 80, which is formed of metal and has elasticity. The mounting plate 80 is placed so that a hole 81 formed thereto is matched with screw engagement holes 42 and 62 formed to the rear engagement surfaces 38 and 58, and while it is in contact with the rear surface of the stand unit 38, it is attached using a screw and the like. The upper portion of the mounting plate 80 is bent toward the front, having formed integrally thereto an engagement portion 82 to be engaged with either the engagement surfaces 46 or 66 of the hinge portion 20.

As shown in FIG. 14, the center of gravity a of the television receiver body 10 is placed substantially at the center in the front-rear direction, in other words, the center of gravity a of the television receiver body 10 is placed frontward than the pivot point b of the hinge portion 20, so that the pivoting force for tilting the television receiver body 10 with respect to the hinge portion 20 differs in the front and rear pivoting directions (directions shown by arrows of FIG. 14).

Next, the operation of the liquid crystal television receiver formed as above will be described.

When an operator tilts the television receiver body 10 forward from the maximum backward tilt position, as shown in FIG. 15, the swing portion 72 of the hinge portion 20 follows the pivoting movement and pivots forward (counterclockwise direction shown in FIG. 15). Then, since the engagement portion 82 is fixed to the engagement surfaces 46 or 66 of the hinge portion 20, the engagement portion 82 follows this pivoting movement and flexibly bends forward. In other words, by tilting the swing portion 72 forward from the maximum backward tilt position, the engagement portion 82 flexibly bends forward, and the television receiver body 10 can be pivoted and stopped at a desired position resisting against the biasing force caused by the bending of the engagement portion 82.

On the other hand, when the operator tilts the television receiver body 10 rearward from the frontward tilted state (clockwise direction shown in FIG. 15), the swing portion 72 follows this pivoting movement and pivots rearward. During this operation, the operator can smoothly and easily tilt the television receiver body 10 rearward by the biasing force of the leaf spring member 80 in addition to the operator's own force.

Thus, by attaching a biasing means formed of a mounting plate 80 and an engagement portion 82 to the hinge portion 20 and biasing the television receiver body 10 rearward by the resilience of engagement portion 82, it is possible to prevent the backlash caused by the gap in the movable area of the hinge portion 20, and the pivoting force for tilting the television receiver body 10 forward and backward can be substantially equalized. Therefore, it becomes possible to tilt the television receiver body 10 in a stable manner, and even if the tilting operation of the television receiver body 10 is performed rapidly, tipping of the body can be prevented. Thus, the present invention can provide a high-quality liquid crystal television receiver.

Moreover, since the mounting plate 80 can easily be attached to the rear of the stand portion 38 of the hinge portion 20 in a detachable manner via a screw or the like, there is no need to provide a large assembly space as in the case of a coil spring, and the size of the hinge portion can be reduced. Furthermore, the cost of the biasing means composed of the mounting plate 80 and engagement portion 82 is low compared to the cost of a coil spring, so the costs of the required components can be cut down. Thus, the present invention enables to provide a cost-effective liquid crystal television receiver.

Further, since the thickness and the like of the biasing means can be varied so as to easily change the biasing force of the engagement portion 82 to correspond with the size or weight of the television receiver body 10 attached above the hinge portion 20, the liquid crystal television receiver according to the present invention has advantageous compatibility and is highly cost effective.

What is claimed is:

1. A liquid crystal television receiver comprising a television receiver body equipped with a liquid crystal panel and a control unit, which is pivotally supported on a leg portion so as to enable tilting of the television receiver body in front and rear directions, wherein a hinge portion for pivotally supporting the television receiver body in a tiltable manner is formed of a pair of left and right hinge portions, the left and right hinge portions each respectively composed of a stand portion attached to the leg portion and a swing portion attached to the television receiver body, and the left and right hinge portions representing respective discrete elements subsequently assembled to form an integral hinge portion,
    wherein the left and right hinge portions are formed to have plane symmetric shapes, and the left and right hinge portions are assembled and screwed together to form the hinge portion, and
    the stand portions of the left and right hinge portions are respectively shaped to have an angulated U-shape cross-section, and the stand portions are assembled by having the openings of the U-shapes oppose one another to form a square column shape.

2. The liquid crystal television receiver according to claim 1, wherein the stand portion of the hinge portion having an assembled rectangular column shape is formed so that in front and rear directions of the liquid crystal television receiver the stand portion constitutes a double layered structure.

3. A liquid crystal television receiver comprising a television receiver body equipped with a liquid crystal panel and a control unit, which is pivotally supported on a leg portion so as to enable tilting of the television receiver body in front and rear directions, wherein a hinge portion for pivotally supporting the television receiver body in a tiltable manner is formed of a pair of left and right hinge portions, the left and right hinge portions each respectively composed of a stand portion attached to the leg portion and a swing portion attached to the television receiver body, and the left and right hinge portions representing respective discrete elements subsequently assembled to form an integral hinge portion,
    wherein the stand portion and swing portion of the left and right hinge portions are pivotally supported via a pin, and the pin is riveted to pivotally fasten the stand portion and the swing portion together in a tiltable manner.

4. A liquid crystal television receiver comprising a television receiver body equipped with a liquid crystal panel and a control unit, which is pivotally supported on a leg portion so as to enable tilting of the television receiver body in front and rear directions, wherein a hinge portion for pivotally supporting the television receiver body in a tiltable manner is formed of a pair of left and right hinge portions, the left and right hinge portions each respectively composed of a stand portion attached to the leg portion and a swing portion attached to the television receiver body, and the left and right hinge portions representing respective discrete elements subsequently assembled to form an integral hinge portion,
wherein a biasing means for biasing the swing portion is attached to the stand portion, and the biasing means biases the swing portion rearward when the television receiver body is tilted to the frontward direction.

5. The liquid crystal television receiver according to claim 4, wherein the biasing means is composed of a fixing plate fixed to the stand portion and an engagement portion integrally formed with the mounting plate and engaged to the swing portion.

* * * * *